US009913245B2

(12) United States Patent
Batchu et al.

(10) Patent No.: US 9,913,245 B2
(45) Date of Patent: Mar. 6, 2018

(54) MULTI-SUBSCRIBER IDENTITY MODULE (SIM) CALL SETUP

(71) Applicant: QUALCOMM Incorporated, San Diego, CA (US)

(72) Inventors: Bhaskara Viswanadham Batchu, Hyderabad (IN); Sharad Shahi, Boulder, CO (US); Troy Russell Curtiss, Boulder, CO (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/921,623

(22) Filed: Oct. 23, 2015

(65) Prior Publication Data

US 2017/0118737 A1    Apr. 27, 2017

(51) Int. Cl.
| | | |
|---|---|---|
| H04W 36/00 | (2009.01) | |
| H04W 76/02 | (2009.01) | |
| H04W 68/00 | (2009.01) | |
| H04B 1/3816 | (2015.01) | |
| H04W 88/06 | (2009.01) | |
| H04W 36/30 | (2009.01) | |
| H04W 36/14 | (2009.01) | |
| H04W 8/18 | (2009.01) | |

(52) U.S. Cl.
CPC ........ *H04W 68/005* (2013.01); *H04B 1/3816* (2013.01); *H04W 36/0022* (2013.01); *H04W 76/02* (2013.01); *H04W 76/025* (2013.01); *H04W 8/183* (2013.01); *H04W 36/14* (2013.01); *H04W 36/30* (2013.01); *H04W 88/06* (2013.01)

(58) Field of Classification Search
CPC . H04W 36/0022; H04W 36/30; H04W 36/14; H04W 48/16; H04W 88/06; H04W 76/026; H04W 48/18; H04W 76/028; H04W 92/02; H04W 36/00; H04W 60/005; H04W 76/02; H04W 36/0016; H04B 17/318
See application file for complete search history.

(56) References Cited

U.S. PATENT DOCUMENTS

| | | | |
|---|---|---|---|
| 8,639,274 B2 | 1/2014 | Zhang et al. | |
| 9,001,655 B2 | 4/2015 | Watfa et al. | |
| 9,374,697 B2 * | 6/2016 | Shih | .................. H04W 4/22 |
| 2012/0039167 A1 | 2/2012 | Swaminathan et al. | |
| 2013/0051362 A1 * | 2/2013 | Lee | ................... H04W 36/30 370/331 |
| 2013/0094446 A1 | 4/2013 | Swaminathan | |
| 2013/0295920 A1 | 11/2013 | Viswanadham et al. | |

(Continued)

OTHER PUBLICATIONS

International Search Report and Written Opinion—PCT/US2016/052664—ISA/EPO—Jan. 2, 2017.

*Primary Examiner* — Olumide T Ajibade Akonai
(74) *Attorney, Agent, or Firm* — Paradice and Li LLP (57) ABSTRACT

Apparatuses and methods for a wireless communication device having a first radio access technology (RAT) and a second RAT to set up a call for the second RAT is described herein, including, but not limited to, detecting a call for the second RAT. In response to detecting the call for the second RAT, a fallback procedure is performed for the first RAT when network conditions associated with the first RAT are not below a threshold. At least one page response is transmitted after the fallback procedure has been completed.

26 Claims, 8 Drawing Sheets

(56) References Cited

U.S. PATENT DOCUMENTS

| | | | |
|---|---|---|---|
| 2013/0303181 A1 | 11/2013 | Rajurkar et al. | |
| 2014/0043975 A1* | 2/2014 | Zhu | H04W 28/02 |
| | | | 370/235 |
| 2014/0113636 A1* | 4/2014 | Lee | H04W 36/00 |
| | | | 455/437 |
| 2014/0146784 A1 | 5/2014 | Swaminathan et al. | |
| 2015/0087308 A1* | 3/2015 | Jeong | H04W 36/0022 |
| | | | 455/436 |
| 2015/0208285 A1* | 7/2015 | Liao | H04W 36/0022 |
| | | | 370/332 |

* cited by examiner

MULTI-SUBSCRIBER IDENTITY MODULE (SIM) CALL SETUP

BACKGROUND

A wireless communication device, such as a mobile phone device or a smart phone, may include at least one SIM. Each SIM may enable one or more subscriptions corresponding to RATs. Specifically, with respect to multi-SIM wireless communication devices, when all SIMs are active, the wireless communication device may be a Multi-SIM-Multi-Active (MSMA) wireless communication device. When one SIM in a Multi-SIM wireless communication device is active while the rest of the SIM(s) is/are standing by, the wireless communication device may be a Multi-SIM-Multi-Standby (MSMS) wireless communication device. The RATs may include, but are not limited to, Frequency Division Multiple Access (FDMA), Time Division Multiple Access (TDMA), Code Division Multiple Access (CDMA) (particularly, Evolution-Data Optimized (EVDO)), Universal Mobile Telecommunications Systems (UMTS) (particularly, Wideband Code Division Multiple Access (WCDMA), Long Term Evolution (LTE), High-Speed Downlink Packet Access (HSDPA), and the like), Global System for Mobile Communications (GSM), Code Division Multiple Access 1× Radio Transmission Technology (1×), General Packet Radio Service (GPRS), Wi-Fi, Personal Communications Service (PCS), and other protocols that may be used in a wireless communications network or a data communications network.

In a Single Radio Long Term Evolution (SRLTE) mode of operation, stacks of a first RAT and a second RAT may share the RF resources of the wireless communication device. In some cases, when a call for the second RAT (e.g., 1×) is being made, the wireless communication device may trigger an Extended Service Request (ESR) for the first RAT (e.g., LTE) before the call of the second RAT is processed. The ESR may indicate to the network associated with the first RAT that a fallback for the first RAT is in order. The ESR may delay the second RAT call for a time period (e.g. approximately 500 ms, which typically may be an approximate duration of the ESR). Given that the call of the second RAT (particularly 1×) may fail if not responded to within a specified time, the delay due to ESR may cause the call of the second RAT to fail when the wireless communication device attempts to respond to page of the second during the ESR of the first RAT. This effect is especially pronounced when the ESR takes about 600 ms. The second RAT may stand by to validate an Access Parameter Message (APM). Validating the APM can delay the call for up to 4 seconds. Often, the APM does not change.

SUMMARY

Embodiments relate to reducing a call setup time and overall power consumption associated with setting up a call for a second Radio Access Technology (RAT) in a wireless communication device with multiple Subscriber Identity Modules (SIMs) that enable multiple RATs. Particular embodiments relate to allowing a higher level of tolerance for fallback procedures of a first RAT by changing call setup procedures of the second RAT to reduce likelihood of a dropped call.

In some embodiments, a method is provided for a wireless communication device having a first RAT and a second RAT to set up a call for the second RAT, where the method includes, but is not limited to, detecting a call for the second RAT, in response to detecting the call for the second RAT, performing a fallback procedure for the first RAT when network conditions associated with the first RAT are not below a threshold, and starting to transmit at least one page response after the fallback procedure has been completed.

According to some embodiments, the method further includes configuring the wireless communication device to operate in a Single Radio Long Term Evolution (SRLTE) mode.

According to some embodiments, the method further includes configuring the wireless communication device to hold two or more Subscriber Identity Modules (SIMs). A first SIM of the two or more SIMs corresponds to the first RAT. A second SIM of the two or more SIMs corresponds to the second RAT.

According to some embodiments, the method further includes determining the network conditions. The threshold is associated with packet delays for packets transmitted via the first RAT.

According to some embodiments, the method further includes determining the network conditions, wherein the threshold is associated with at least one of Reference Signal Receive Power (RSRP), Reference Signal Received Quality (RSRQ), or Signal to Interference and Noise Ratio (SINR).

According to some embodiments, the fallback procedure is an Extended Service Request (ESR).

In some embodiments, the at least one page response is transmitted for a maximum retransmission duration. The maximum retransmission duration equals to a default retransmission duration specified for the second RAT minus a retransmission adjustment time. The retransmission adjustment time is time used to complete the fallback procedure.

According to some embodiments, the method further includes bypassing the fallback procedure for the first RAT when the network conditions associated with the first RAT are below the threshold.

According to some embodiments, the at least one page response is transmitted for a maximum retransmission duration. The maximum retransmission duration equals a default retransmission duration specified for the second RAT in a case where the network conditions associated with the first RAT are below the threshold and the fallback procedure is bypassed.

According to some embodiments, a first page response of the at least one page response is transmitted without waiting for updates on an Access Parameter Message (APM).

According to some embodiments, the method further includes receiving a updated APM after transmitting the first page response and using the updated APM for a subsequent one of the at least one page response for the second RAT.

According to some embodiments, the method further includes transmitting the at least one page response until the call for the second RAT is connected or until the maximum retransmission duration expires without connecting the call.

In various embodiments, a wireless communication device includes at least one radio frequency (RF) resource and a processor coupled to the at least one RF resource. The processor is configured to connect to a first SIM associated with a first RAT and to a second SIM associated with a second RAT, and configured with processor-executable instructions to detect a call for the second RAT, in response to detecting the call for the second RAT, perform a fallback procedure for the first RAT when network conditions associated with the first RAT are not below a threshold, and start to transmit at least one page response after the fallback procedure has been completed.

In some embodiments, the processor is further configured to determine the network conditions, wherein the threshold is associated with packet delays for packets transmitted via the first RAT.

In various embodiments, the processor is further configured to determine the network conditions, wherein the threshold is associated with at least one of RSRP, RSRQ, or SINR.

In some embodiments, the fallback procedure is an ESR.

In various embodiments, the at least one page response is transmitted for a maximum retransmission duration. The maximum retransmission duration equals to a default retransmission duration specified for the second RAT minus a retransmission adjustment time. The retransmission adjustment time is time used to complete the fallback procedure.

In some embodiments, the processor is further configured to bypass the fallback procedure for the first RAT when the network conditions associated with the first RAT are below the threshold.

In various embodiments, the at least one page response is transmitted for a maximum retransmission duration. The maximum retransmission duration equals a default retransmission duration specified for the second RAT in a case where the network conditions associated with the first RAT are below the threshold and the fallback procedure is bypassed.

According to some embodiments, a first page response of the at least one page response is transmitted without waiting for updates on an APM.

In some embodiments, the processor is further configured to receive a updated APM after transmitting the first page response and use the updated APM for a subsequent one of the at least one page response for the second RAT.

In some embodiments, the processor is further configured to transmit the at least one page response until the call for the second RAT is connected or until the maximum retransmission duration expires without connecting the call.

According to some embodiments, a method for a wireless communication device having a first RAT and a second RAT to set up a call for the second RAT, the method including detecting a call for the second RAT, in response to detecting the call for the second RAT, performing a fallback procedure for the first RAT when network conditions associated with the first RAT are not below a threshold, and in response to detecting the call for the second RAT, bypassing the fallback procedure for the first RAT when network conditions associated with the first RAT are below the threshold.

In some embodiments, the method further includes transmitting at least one page response responding to the detected call after the fallback procedure has been completed when the network conditions associated with the first RAT are not below the threshold.

In some embodiments, a first one of the at least one page response is transmitted without validating an APM, the method further including receiving a updated APM after transmitting the first one of the at least one page response and using the updated APM for a subsequent retransmission of the page response for the second RAT.

According to some embodiments, a wireless communication device includes at least one radio frequency (RF) resource and a processor coupled to the at least one RF resource, configured to connect to a first SIM associated with a first RAT and to a second SIM associated with a second RAT, and configured with processor-executable instructions to: detect a call for the second RAT, in response to detecting the call for the second RAT, perform a fallback procedure for the first RAT when network conditions associated with the first RAT are not below a threshold, and in response to detecting the call for the second RAT, bypass the fallback procedure for the first RAT when network conditions associated with the first RAT are below the threshold.

In some embodiments, the processor is further configured to transmit at least one page response responding to the detected call after the fallback procedure has been completed when the network conditions associated with the first RAT are not below the threshold.

According to some embodiments, a first one of the at least one page response is transmitted without validating an APM. The processor is further configured to receive an updated APM after transmitting the first one of the at least one page response and use the updated APM for a subsequent retransmission of the page response for the second RAT.

BRIEF DESCRIPTION OF THE DRAWINGS

The accompanying drawings, which are incorporated herein and constitute part of this specification, illustrate exemplary embodiments of the disclosure, and together with the general description given above and the detailed description given below, serve to explain the features of the various embodiments.

DETAILED DESCRIPTION

Various embodiments will be described in detail with reference to the accompanying drawings. Wherever possible, the same reference numbers may be used throughout the drawings to refer to the same or like parts. Different reference numbers may be used to refer to different, same, or similar parts. References made to particular examples and implementations are for illustrative purposes, and are not intended to limit the scope of the disclosure or the claims.

Some modern communication devices, referred to herein as a user equipment (wireless communication device) or mobile station (MS), may include any one or all of cellular telephones, smart phones, personal or mobile multi-media players, personal data assistants, laptop computers, personal computers, tablet computers, smart books, palm-top computers, wireless electronic mail receivers, multimedia Internet-enabled cellular telephones, wireless gaming controllers, and similar personal electronic devices. Such devices may include at least one Subscriber Identity Module (SIM), a programmable processor, memory, and circuitry for connecting to two or more mobile communication networks simultaneously.

A wireless communication device may include one or more SIMs that provide users of the wireless communication devices with access to one or multiple separate mobile communication networks. The mobile communication networks are supported by Radio Access Technologies (RATs). Examples of wireless communication devices may include, but are not limited to, mobile phones, laptop computers, smart phones, and other mobile communication devices of the like that are configured to connect to one or more RATs. Examples of RATs may include, but are not limited to, Frequency Division Multiple Access (FDMA), Time Division Multiple Access (TDMA), Code Division Multiple Access (CDMA) (particularly, Evolution-Data Optimized (EVDO)), Universal Mobile Telecommunications Systems (UMTS) (particularly, Wideband Code Division Multiple Access (WCDMA), Long Term Evolution (LTE), High-Speed Downlink Packet Access (HSDPA), and the like), Global System for Mobile Communications (GSM), Code Division Multiple Access 1× Radio Transmission Technology (1×), General Packet Radio Service (GPRS), Wi-Fi, Personal Communications Service (PCS), and other protocols that may be used in a wireless communications network or a data communications network. Each RAT may be associated with at least one subscription.

A wireless communication device provided with a plurality of SIMs and connected to two or more separate (or same) RATs with one RAT being active at a given time is a multi-SIM-multi-standby (MSMS) communication device. In one example, the MSMS communication device may be a dual-SIM-dual-standby (DSDS) communication device, which may include two SIM cards/RATs that may both be active on standby, but one is deactivated when the other one is in use. In another example, the MSMS communication device may be a triple-SIM-triple-standby (TSTS) communication device, which includes three SIM cards/RATs that may all be active on standby, where two may be deactivated when the third one is in use. In other examples, the MSMS communication device may be other suitable multi-SIM communication devices, with, for example, four or more SIMs, such that when one is in use, the others may be deactivated.

On the other hand, a wireless communication device that includes a plurality of SIMs and connects to two or more separate (or same) RATs with two or more RATs being active at a given time may be a MSMA communication device. An example MSMA communication device is a dual-SIM-dual-active (DSDA) communication device, which includes two SIM cards/RATs. Both SIMs may remain active. In another example, the MSMA device may be a triple-SIM-triple-active (TSTA) communication device, which includes three SIM cards/RATs. All three SIMs may remain active. In other examples, the MSMA communication device may be other suitable multi-SIM communication devices with four or more SIMs, for which that all SIMs may be active.

Generally, embodiments described herein may be applicable to a MSMA wireless communication device where two or more RATs (e.g., LTE-and-1×, LTE-and-GSM, or the like) are active at the same time. Particularly, embodiments described herein may be applicable to wireless communication devices operating in the Single Radio Long Term Evolution (SRLTE) mode. In the SRLTE mode, a first RAT and a second RAT may share the Radio Frequency (RF) resources of the wireless communication device.

As used herein, the terms "SIM," "SIM card," and "subscriber identification module" are used interchangeably to refer to a memory that may be an integrated circuit or embedded into a removable card, and that stores an International Mobile Subscriber Identity (IMSI), related key, and/or other information used to identify and/or authenticate a wireless device on a network and enable a communication service with the network. Because the information stored in a SIM enables the wireless device to establish a communication link for a particular communication service with a particular network, the term "SIM" may also be used herein as a shorthand reference to the communication service associated with and enabled by the information (e.g., in the form of various parameters) stored in a particular SIM as the SIM and the communication network, as well as the services and RATs supported by that network, correlate to one another.

Systems and methods are described herein for setting up a call in a multi-SIM wireless communication device. In general, the proposed systems and methods avoid the Extended Service Request (ESR) process for the first RAT (such as, but not limited to, LTE) when the wireless communication device determines that the ESR process is expected to take an intolerably long time and/or the ESR process is not expected to be successful. Such determination may be made based on the RF conditions for the first RAT. When the wireless communication device cannot accurately determine an expected completion time for the ESR process, more time may be given to the first RAT for the ESR processes while retransmission delays for the second RAT may be delayed. When the RF conditions are above an acceptance level (e.g., when the RF conditions are good) for the second RAT, page responses may not need to be transmitted until the maximum allowed time(s) of retransmission(s). Therefore, the page responses for the second RAT may be timely sent after accommodating the ESR of the first RAT.

For a wireless communication device that is operating in the SRLTE mode, the wireless communication device may first detect a voice call for the second RAT. In response, the wireless communication device may determine whether the RF conditions for the first RAT is below the acceptance level. The RF conditions for the first RAT may be measured based on packet delays for data packets transmitted via the first RAT. The data packets may be transmitted currently (e.g., for the ESR processes) or previously. Other suitable metrics such as a Reference Signal Receive Power (RSRP), Reference Signal Received Quality (RSRQ), and Signal to Interference and Noise Ratio (SINR) may be used to determine whether or not the first RAT RF conditions are below the predetermined acceptance level.

When the first RAT RF conditions are determined to be below the acceptance level (RF conditions are bad), the wireless communication device may set a retransmission adjustment time to be 0. In this case, the ESR processes may be bypassed. As a result, power and time may be saved by not performing a fallback procedure that is likely to fail regardless, when the network conditions are not acceptable. On the other hand, when the first RAT RF conditions are determined to be above the acceptance level (RF conditions are good), the wireless communication device may set the retransmission adjustment time to be the time it takes to complete the ESR process for the first RAT. For example, after the wireless communication device determines that the first RAT RF conditions are determined to be above the predetermined acceptance level, the ESR for the first RAT may be triggered. The wireless communication device may detect and/or record the time it takes to complete the ESR.

Next, the wireless communication device may determine a maximum retransmission duration. The maximum retransmission duration may be a time interval allowed to retransmit page responses of the second RAT. The maximum retransmission duration may equal to a default retransmission duration (according to the specification of the second RAT) adjusted by (by subtraction) the retransmission adjusted time. Therefore, when the first RAT RF conditions are below the predetermined acceptance level, the maximum retransmission duration may equal to a default retransmission duration, because the retransmission adjusted time is 0. On the other hand, when the first RAT RF conditions are above the predetermined acceptance level, the maximum retransmission duration may equal to a default retransmission duration subtracted by retransmission adjusted time. Then, the wireless communication device may transmit/retransmit the page responses of the second RAT within the maximum retransmission duration.

In some embodiments, instead of standing by to validate the APM before transmission of the page response, the wireless communication device may directly transmit the page response while waiting for the APM. When the wireless communication device determines that the APM parameters are stale (need updating) during the transmission and retransmission of the APM, the wireless communication device may update these parameters for the next retransmission attempt.

Figure 1:
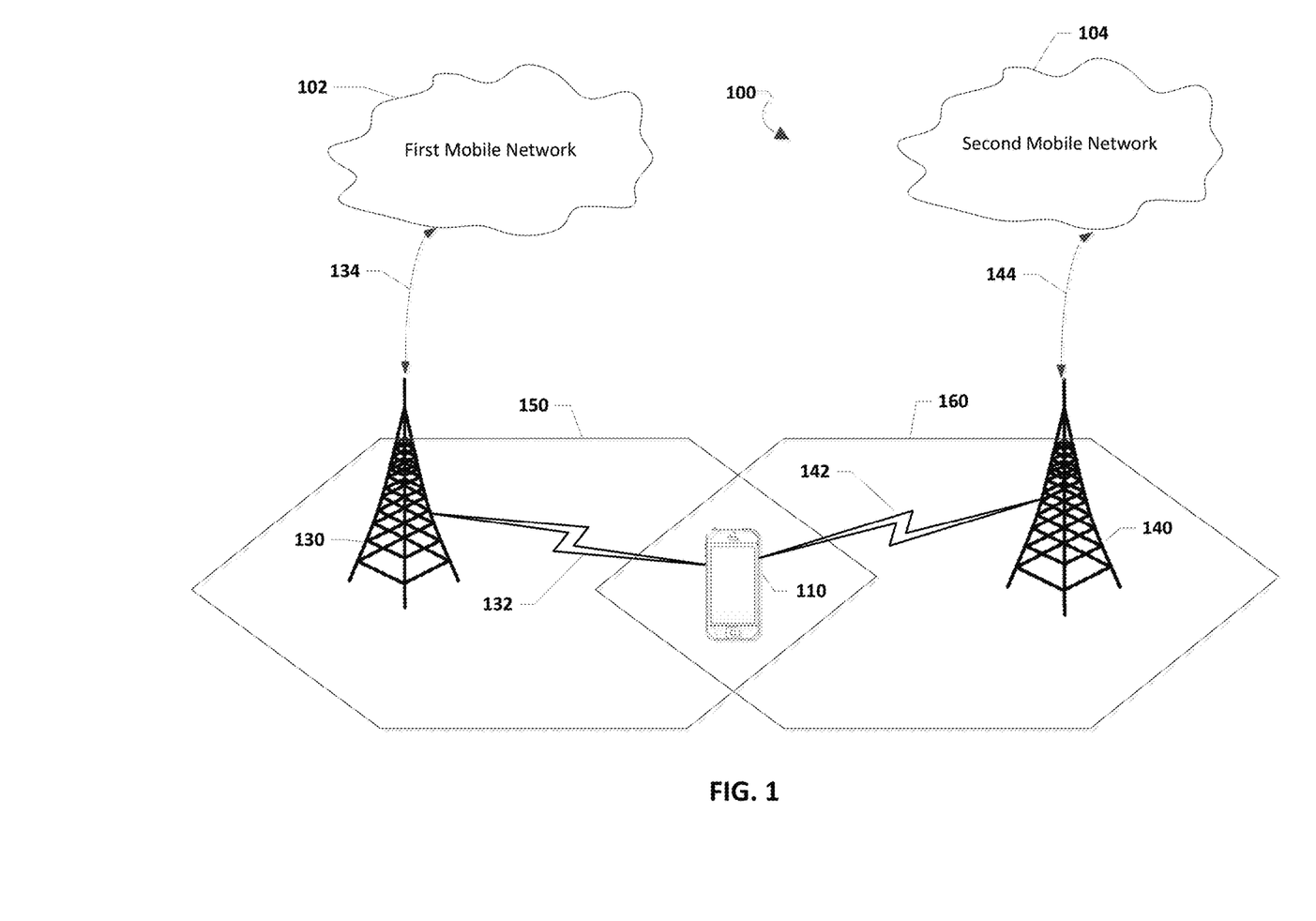
FIG. 1 is a schematic diagram of a communication system in accordance with various embodiments.

Various embodiments may be implemented within a communication system 100, an example of which is illustrated in FIG. 1. A first mobile network 102 and a second mobile network 104 may each associate with a plurality of cellular base stations (e.g., a first base station 130 and a second base station 140). The first base station 130 may broadcast the first mobile network 102 in a first serving cell 150. The second base station 140 may broadcast the second mobile network 104 in a second serving cell 160. A wireless communication device 110 may be associated with both the first serving cell 150 and the second serving cell 160.

The wireless communication device 110 may be in communication with the first mobile network 102 through a first cellular connection 132 to the first base station 130. The first cellular connection 132 may correspond to the first RAT of the wireless communication device 110. The wireless communication device 110 may also be in communication with the second mobile network 104 through a second cellular connection 142 to the second base station 140. The second cellular connection 142 may correspond to the second RAT of the wireless communication device 110, as in a multi-SIM context. The first base station 130 may be in communication with the first mobile network 102 over a wired or wireless connection 134. The second base station 140 may be in communication with the second mobile network 104 over a wired or wireless connection 144.

The first cellular connection 132 and the second cellular connection 142 may be made through two-way wireless communication links. Each of the wireless communication links may be enable by any suitable protocol including, but not limited to, FDMA, TDMA, CDMA (e.g., EVDO), UMTS (e.g., WCDMA, LTE, HSDPA, or the like), GSM, 1×, GPRS, Wi-Fi, PCS, and/or another protocol used in a wireless communications network or a data communications network. By way of illustrating with a non-limiting example, the first cellular connection 132 may be a LTE connection. The second cellular connection 142 may be a 1× or GSM connection. Other RAT subscriptions (such as, but not limited to, WCDMA, HSDPA, EVDO, and the like) may be implemented in a similar manner. In some embodiments, the first cellular connection 132 and the second cellular connection 142 may each be associated with a different RAT.

Each of the first base station 130 and the second base station 140 may include at least one antenna group or transmission station located in the same or different areas. The at least one antenna group or transmission station may be associated with signal transmission and reception. Each of the first base station 130 and the second base station 140 may include one or more processors, modulators, multiplexers, demodulators, demultiplexers, antennas, and the like for performing the functions described herein. In some embodiments, the first base station 130 and the second base station 140 may be an access point, Node B, evolved Node B (eNodeB or eNB), base transceiver station (BTS), or the like.

In various embodiments, the wireless communication device 110 may be configured to access the first mobile network 102 and the second mobile network 104 by virtue of the multi-SIM and/or the multi-mode SIM configuration of the wireless communication device 110 (e.g., via the first cellular connection 132 and the second cellular connection 142). When a SIM corresponding to a RAT is inserted, the wireless communication device 110 may access the mobile communication network associated with that RAT based on the information stored on the SIM.

While the wireless communication device 110 is shown connected to the mobile networks 102 and 104 via two cellular connections, in other embodiments (not shown), the wireless communication device 110 may establish additional network connections using at least one additional RAT.

In some embodiments, the wireless communication device 110 may establish a wireless connection with a peripheral device (not shown) used in connection with the wireless communication device 110. For example, the wireless communication device 110 may communicate over a Bluetooth® link with a Bluetooth-enabled personal computing device (e.g., a "smart watch"). In some embodiments, the wireless communication device 110 may establish a wireless connection with a wireless access point (not shown), such as over a Wi-Fi connection. The wireless access point may be configured to connect to the Internet or another network over a wired connection.

Figure 2:
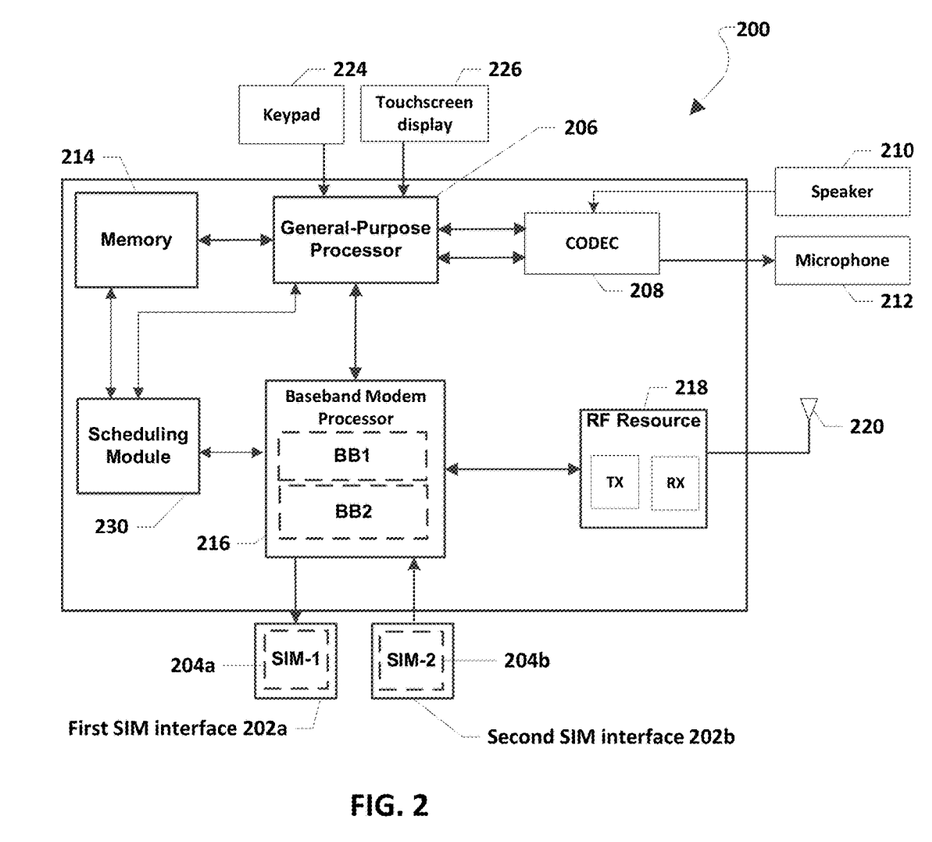
FIG. 2 is a component block diagram of an example of a user device (wireless communication device) according to various embodiments.

FIG. 2 is a functional block diagram of an wireless communication device 200 suitable for implementing various embodiments. According to various embodiments, the wireless communication device 200 may be the wireless communication device 110 as described with reference to FIG. 1. Referring to FIGS. 1-2, the wireless communication device 200 may include a first SIM interface 202a, which may receive a first identity module SIM-1 204a that is associated with the first RAT. The wireless communication device 200 may also include a second SIM interface 202b, which may receive a second identity module SIM-2 204b that is associated with the second RAT. In some embodiments, the first RAT may be different from the second RAT.

A SIM in various embodiments may be a Universal Integrated Circuit Card (UICC) that is configured with SIM and/or Universal SIM (USIM) applications, enabling access to GSM and/or UMTS networks. The UICC may also provide storage for a phone book and other applications. Alternatively, in a CDMA network, a SIM may be a UICC removable user identity module (R-UIM) or a CDMA Subscriber Identity Module (CSIM) on a card. A SIM card may have a Central Processing Unit (CPU), Read Only Memory (ROM), Random Access Memory (RAM), Electrically Erasable Programmable Read-Only Memory (EEPROM) and Input/Output (I/O) circuits. An Integrated Circuit Card Identity (ICCID) SIM serial number may be printed on the SIM card for identification. However, a SIM may be implemented within a portion of memory of the wireless communication device 200, and thus need not be a separate or removable circuit, chip, or card.

A SIM used in various embodiments may store user account information, an IMSI, a set of SIM Application Toolkit (SAT) commands, and other network provisioning information, as well as provide storage space for phone book database of the user's contacts. As part of the network provisioning information, a SIM may store home identifiers (e.g., a System Identification Number (SID)/Network Identification Number (NID) pair, a Home PLMN (HPLMN) code, etc.) to indicate the SIM card network operator provider.

The wireless communication device 200 may include at least one controller, such as a general-purpose processor 206, which may be coupled to a coder/decoder (CODEC) 208. The CODEC 208 may in turn be coupled to a speaker 210 and a microphone 212. The general-purpose processor 206 may also be coupled to at least one memory 214. The general-purpose processor 206 may include any suitable data processing device, such as a microprocessor. In the alternative, the general-purpose processor 206 may be any suitable electronic processor, controller, microcontroller, or state machine. The general-purpose processor 206 may also be implemented as a combination of computing devices (e.g., a combination of a Digital Signal Processor (DSP) and a microprocessor, a plurality of microprocessors, at least one microprocessors in conjunction with a DSP core, or any other such configuration).

The memory 214 may be a non-transitory processor-readable storage medium that stores processor-executable instructions. For example, the instructions may include routing communication data relating to the first or second subscription though a corresponding baseband-RF resource chain. The memory 214 may include any suitable internal or external device for storing software and data. Examples of the memory 214 may include, but are not limited to, RAM, ROM, floppy disks, hard disks, dongles or other Recomp Sensor Board (RSB) connected memory devices, or the like. The memory 214 may store an Operating System (OS), user application software, and/or executable instructions. The memory 214 may also store application data, such as an array data structure.

The general-purpose processor 206 and the memory 214 may each be coupled to baseband modem processor 216. Each SIM in the wireless communication device 200 (e.g., the SIM-1 204a and/or the SIM-2 204b) may be associated with a baseband-RF resource chain. A baseband-RF resource chain may include the baseband modem processor 216, which may perform baseband/modem functions for communications on at least one SIM. The baseband modem processor 216 may include one or more amplifiers and radios, referred to generally herein as a RF resource 218 or a RF chain.

The embodiments described herein may be applicable to wireless communication devices in which the first and second RATs share a common set of RF resource (particularly, the RF resource 218). Embodiments described herein may also be applicable to wireless communication devices in which the first and second RATs each has a separate RF resource, but activities of the second RAT may nevertheless de-sense (e.g., interfere with) the first RAT so as to justify blanking or power back-off that prevent either RAT from transmitting or receiving when the other RAT is communicating.

The RF resource 218 may include at least one transceivers that perform transmit/receive functions for the associated SIMs 204a, 204b of the wireless communication device 200. The RF resource 218 may include separate transmit and receive circuitry, or may include a transceiver that combines transmitter and receiver functions. The RF resource 218 may be coupled to a wireless antenna 220. The RF resource 218 may also be coupled to the baseband modem processor 216.

In some embodiments, the general-purpose processor 206, the memory 214, the baseband modem processor 216, and the RF resource 218 may be included in the wireless communication device 200 as a system-on-chip. In some embodiments, the first and second SIMs 202a, 202b and their corresponding interfaces 204a, 204b may be external to the system-on-chip. Further, various input and output devices may be coupled to components on the system-on-chip, such as interfaces or controllers. Example user input components suitable for use in the wireless communication device 200 may include, but are not limited to, a keypad 224, a touchscreen display 226, and the microphone 212.

In some embodiments, the keypad 224, the touchscreen display 226, the microphone 212, or a combination thereof, may perform the function of receiving a request to initiate an outgoing call. For example, the touchscreen display 226 may receive a selection of a contact from a contact list or receive a telephone number. In another example, either or both of the touchscreen display 226 and the microphone 212 may perform the function of receiving a request to initiate an outgoing call. For example, the touchscreen display 226 may receive a selection of a contact from a contact list or to receive a telephone number. As another example, the request to initiate the outgoing call may be in the form of a voice command received via the microphone 212. Interfaces may be provided between the various software modules and functions in the wireless communication device 200 to enable communication between them.

The wireless communication device 200 may include a scheduling module 230 configured to manage and/or schedule activities of the first and the second RATs. For example, the scheduling module 230 be configured perform the processes described herein with respect to conducting a fallback procedure for the first RAT and setting up a call for the second RAT.

In some embodiments, the scheduling module 230 may be implemented within the general-purpose processor 206. For example, the scheduling module 230 may be implemented as a software application stored within the memory 214 and executed by the general-purpose processor 206. Accordingly, such embodiments can be implemented with minimal additional hardware costs. However, other embodiments relate to systems and processes implemented with dedicated hardware specifically configured for performing operations described herein with respect to the scheduling module 230. For example, the scheduling module 230 may be implemented as a separate processing component (i.e., separate from the general-purpose processor 206). The scheduling module 230 may be coupled to the memory 214, the general processor 206, the baseband processor 216, and/or the RF resource 218 for performing the function described herein.

Hardware and/or software for the functions may be incorporated in the wireless communication device 200 during manufacturing, for example, as a part of a configuration of an original equipment manufacturer (OEM) of the wireless communication device 200. In further embodiments, such hardware and/or software may be added to the wireless communication device 200 post-manufacture, such as by installing one or more hardware devices and/or software applications onto the wireless communication device 200.

In embodiments not shown in the FIGS., the wireless communication device 200 may include, among other things, additional SIM cards, SIM interfaces, at least another RF resource associated with the additional SIM cards, and additional antennas for connecting to additional mobile networks.

Figure 3:
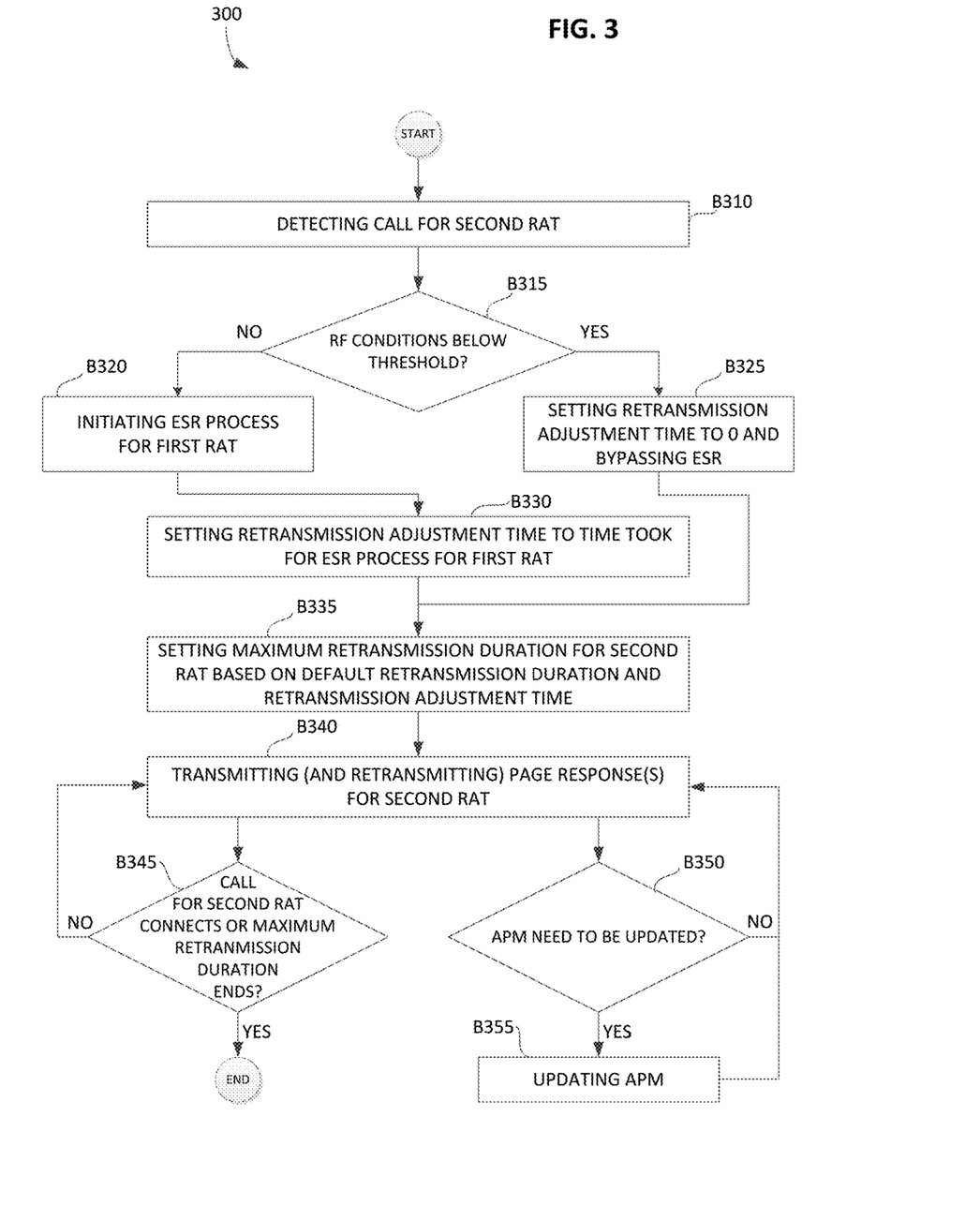
FIG. 3 is a process flowchart diagram illustrating an example of a call setup method according to various embodiments.

FIG. 3 is a process flowchart diagram illustrating an example of a call setup method 300 according to various embodiments. Referring to FIGS. 1-3, the call setup method 300 may be performed by the general-purpose processor 206 and/or the scheduling module 230 of the wireless communication device 200 according to various embodiments. The method 300 may be performed while the wireless communication device 200 is operating in the SRLTE mode. At block B310, the scheduling module 230 may detect an incoming call for the second RAT. As a non-limiting example, the second RAT may be 1x. As another non-limiting example, the second RAT may be GSM.

In response to detecting the call, the scheduling module 230 may determine whether RF conditions for the first RAT are below a threshold, at block B315. Illustrating with a non-limiting example, the first RAT may be LTE. RF conditions with respect to the first RAT may refer to network conditions measured by determining a packet delay for packets transmitted via the first RAT. In some embodiments, the packet delay may be any suitable packet delay (of the first RAT) measured and stored within a predetermined period of time (e.g., 5 s, 10 s, 30 s, 60 s, or the like) before detecting the call for the second RAT at block B310. The use of recently and previously determined packet delay can serve to expedite the call setup method 300 while using relatively fresh information for accuracy. The threshold with respect to the packet delay may be, for example, 200 ms, 300 ms, 400 ms, 500 ms, 600 ms, or the like.

Other suitable measuring tools such as the RSRP, RSRQ, and SINR may be used to determine whether the first RAT RF conditions are below the threshold (acceptance level).

In response to determining that the RF conditions are not below the threshold, the scheduling module 230 may initiate the ESR process for the first RAT, at block B320 (B315:NO). The RF conditions with respect to the first RAT not being below the threshold may indicate that the ESR process is likely to succeed. At the completion of the ESR process, the scheduling module 230 may note the time used for the ESR process. The scheduling module 230 may set the retransmission adjustment time (x) to the time used to complete the ESR process for the first RAT, at block B330. In other words:

$$x = T_{ESR} \quad (1)$$

where $T_{ESR}$ is the time used for the ESR process for the first RAT.

On the other hand, in response to determining that the RF conditions are below the threshold, the scheduling module 230 may set the retransmission adjustment time (x) to 0 and bypass the ESR for the first RAT at block B325 (B315:YES). That is, $$x = 0 \quad (2)$$

The RF conditions with respect to the first RAT being below the threshold may indicate that the ESR process is likely to fail. Therefore, ESR is not initiated as a whole, to avoid wasting time and processing power.

In alternative embodiments, the packet delay may be determined in response to detecting the call for the second RAT at block B310, using packets transmitted for the ESR process for the first RAT (at block B320). For example, the ESR process may be started while the RF conditions are being measured using the packets transmitted for the ESR process. When the RF conditions are below the threshold, the ESR process may be terminated immediately and the retransmission adjustment time may be set to the time actually spent $T_{ESRinc}$ for the incomplete ESR process, as shown in equation (3) below.

$$x = T_{ESRinc} \quad (3)$$

The scheduling module 230 may set the maximum retransmission duration ($T_{max}$) for the second RAT based on the default retransmission duration ($T_{default}$) and the retransmission adjustment time (x), at block B335. The maximum retransmission duration is a period of time in which the wireless communication device 200 may be allowed to transmit/retransmit page response(s) of the second RAT in response to the call detected at block B310, taking into account adjustments (including, but not limited to, the retransmission adjustment time) described herein. The default retransmission duration is a period of time in which the wireless communication device 200 may be allowed to retransmit the page response for the second RAT as specified in a standard protocol for the second RAT (without any adjustments proposed herein). In particular embodiments, the maximum retransmission duration may equal to the default retransmission duration minus the retransmission adjustment time, i.e.:

$$T_{max} = T_{default} - x \quad (4)$$

For example, in response to determining that the RF conditions are not below the threshold (B315:NO), the maximum retransmission duration may equal to the default retransmission duration subtracted by a greater-than-zero retransmission adjustment time, such as:

$$T_{max} = T_{default} - x; x > 0 \quad (5)$$

In response to determining that the RF conditions are below the threshold (B315:YES), the maximum retransmission duration may equal to the default retransmission duration, such as:

$$T_{max} = T_{default} \quad (6)$$

Furthermore, when the packet delay is measured using the packets for the ESR and when the ESR is terminated prior to completion given that RF conditions are below the threshold, the maximum retransmission duration may equal to the default retransmission duration minus the time spent ($T_{ESRinc}$) on the incomplete ESR process, such as:

$$T_{max} = T_{default} - T_{ESRinc} \quad (7)$$

At block B340, the scheduling module 230 may transmit (and retransmit, if the first page response is unsuccessful) at least one page response for the second RAT within the maximum retransmission duration. For example, the scheduling module 230 may configure the wireless communication device 200 to transmit the at least one page response after the ESR process has been completed at block B320 in response to detecting that the RF conditions are not below the threshold (B315:NO). The scheduling module 230 may configure the wireless communication device 200 to transmit the at least one page response without initiating the ESR process when the RF conditions are below the threshold (B315:YES). Alternatively, the scheduling module 230 may configure the wireless communication device 200 to transmit the at least one page response after the ESR process has been terminated prior to successful completion of the ESR.

At block B345, the scheduling module 230 may determine whether the call for the second RAT has been connected or whether the maximum retransmission duration has ended without connecting the call. In response to determining that the call for the second RAT has been connected or that the maximum retransmission duration has ended without connecting the call, the call setup method 300 may end (B345:YES). In response to determining that the call for the second RAT has not been connected and the maximum retransmission duration has not ended without connecting the call (B345:NO), then the scheduling module 230 may continue to configure the wireless communication device 200 to transmit/retransmit the at least one page response at block B340.

In some embodiments, a first page response may be transmitted at block B340 before validating the APM. After transmitting the first page response for the second RAT, the scheduling unit 230 may determine, while transmitting the rest of the at least one page response (if necessary) whether the APM has been changed at block B350. The scheduling module 230 may determine whether the current APM is stale (i.e., should be updated). In response to determining that the APM needs to be updated (B350:YES), the scheduling unit 230 may update the APM and apply an updated APM to the next transmission of a subsequent page response at block B355. Transmission/retransmission continues at block B340 thereafter. On the other hand, in response to determining that the APM does not need to be updated (B350:NO), the scheduling unit 230 may continue to retransmit a subsequent page response using the current APM at block B340.

Figure 4A:
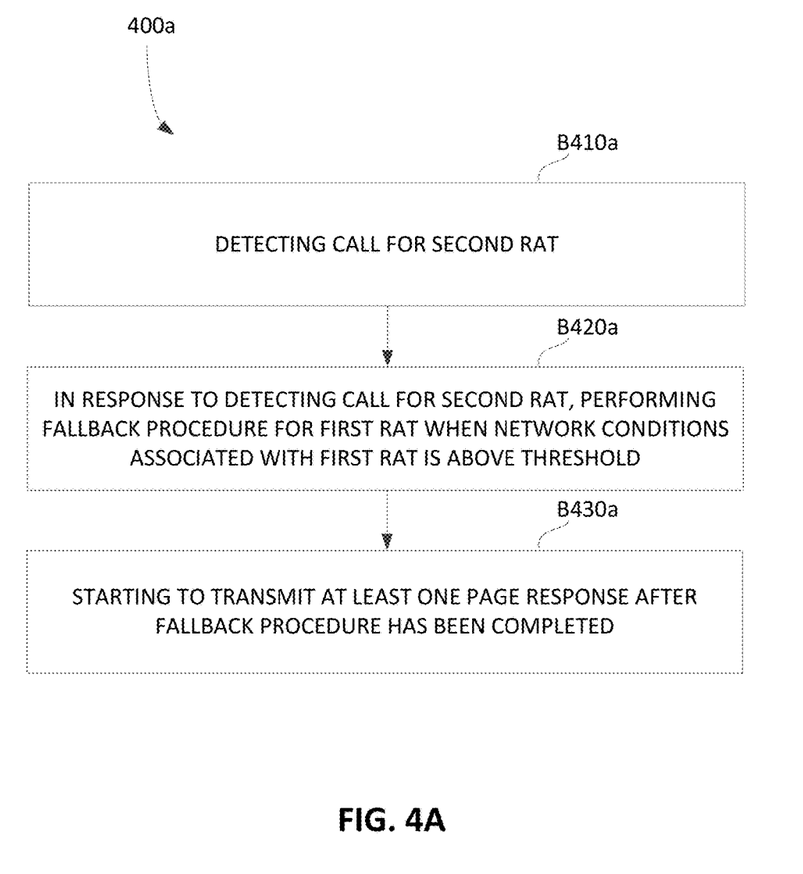
FIG. 4A is a process flowchart diagram illustrating an example of a call setup method according to various embodiments.

FIG. 4A is a process flowchart diagram illustrating an example of a call setup method 400a according to various embodiments. Referring to FIGS. 1-4A, the call setup method 400a may be performed by the general-purpose processor 206 and/or the scheduling module 230 of the wireless communication device 200 according to various embodiments. Each block of the call setup method 400a may correspond to one or more blocks of the call setup method 300. At block B410a, the scheduling module 230 may detect the call for the second RAT in a manner such as, but not limited to, block B310. At block B420a, the scheduling module 230 may perform a fallback procedure for the first RAT when network conditions associated with the first RAT is not below the threshold, in response to detecting the call for the second RAT. The fallback procedure may be the ESR process for the first RAT. The network conditions may be determined in a manner such as, but not limited to, described with respect to block B315.

At block B430a, the scheduling module 230 may start to transmit the at least one page response after the fallback procedure has been completed. As described, when the network conditions are not below the threshold, the fallback procedure is likely to succeed. Initiating the page response transmission after the fallback procedure ends can assure that an actual page response(s) for the second RAT is actually transmitted because the first RAT's usage of the RF resource 218 has ended.

Figure 4B:
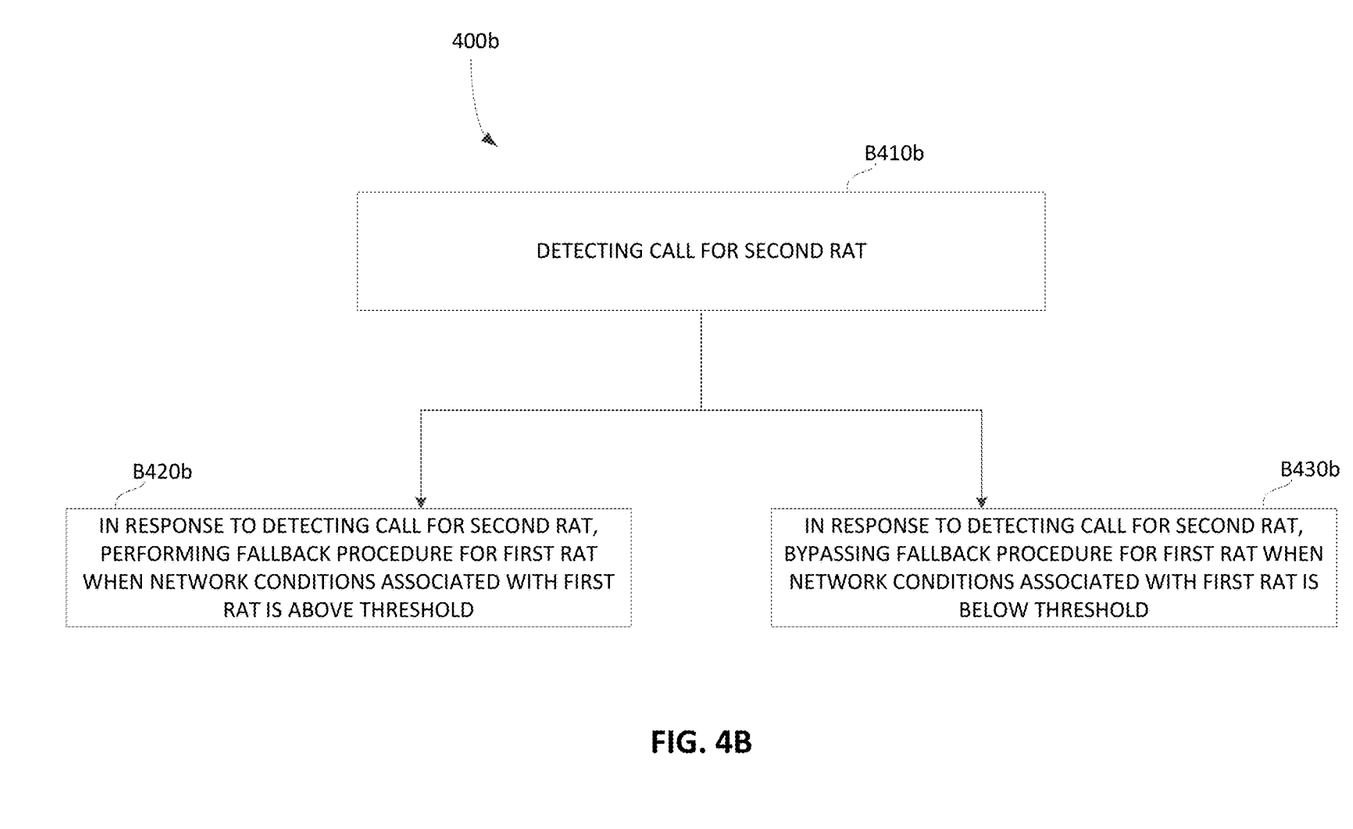
FIG. 4B is a process flowchart diagram illustrating an example of a call setup method according to various embodiments.

FIG. 4B is a process flowchart diagram illustrating an example of a call setup method 400b according to various embodiments. Referring to FIGS. 1-4B, the call setup method 400b may be performed by the general-purpose processor 206 and/or the scheduling module 230 of the wireless communication device 200 according to various embodiments. Each block of the call setup method 400b may correspond to one or more blocks of the call setup methods 300 and 400a. At block B410b, the scheduling module 230 may detect the call for the second RAT as described with respect to blocks B310 and B410a.

At block B420b, the scheduling module 230 may perform the fallback procedure for the first RAT in response to detecting the network conditions associated with the first RAT are not below the threshold, in response to detecting the call for the second RAT. Block B420b may correspond to block B420a.

At block B430b, the scheduling module 230 may bypass (not engage in) the fallback procedure for the first RAT in response to detecting the network conditions associated with the first RAT are below the threshold, in response to detecting the call for the second RAT. The fallback procedure may be bypassed in a manner such as, but not limited to, block B325. The page response transmission may be performed immediate after detecting that the network conditions associated with the first RAT are below the threshold. The scheduling module 230 may not need to standby for the APM updates before transmitting APM may be updated.

Figure 5:
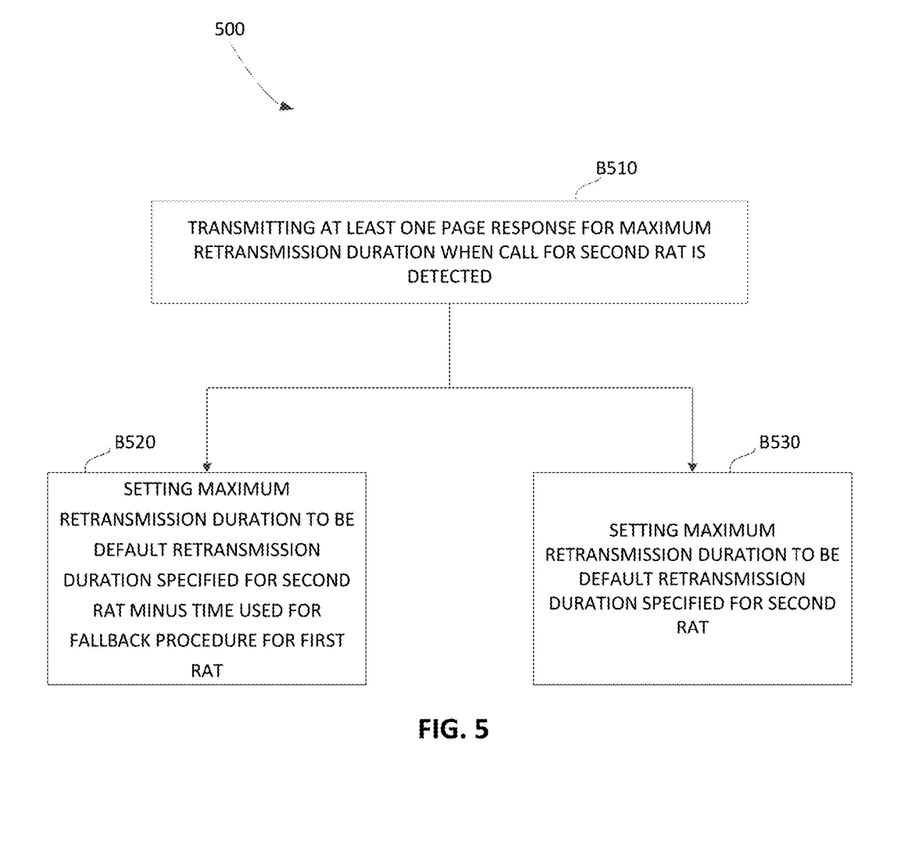
FIG. 5 is a process flowchart diagram illustrating an example of a call setup method according to various embodiments.

FIG. 5 is a process flowchart diagram illustrating an example of a call setup method 500 according to various embodiments. Referring to FIGS. 1-5, the call setup method 500 may be performed by the general-purpose processor 206 and/or the scheduling module 230 of the wireless communication device 200 according to various embodiments. Each block of the call setup method 500 may correspond to one or more blocks of the call setup methods 300, 400a, and 400b.

At block B510, the scheduling module 230 may transmit the at least one page response for the maximum retransmission duration (set according to block B335) when the call for the second RAT is detected. For example, the scheduling module 230 may transmit the at least one page response in a manner such as, but not limited to, block B340.

The maximum retransmission duration (e.g., $T_{max}$) is the default retransmission duration ($T_{default}$) specified for the second RAT minus the time (e.g., $T_{ESR}$) used for the fallback procedure for the first RAT, as shown at block B520. This is the case when the RF conditions are above the threshold. Such relationships may be illustrated by, but not limited to, equation (5).

The maximum retransmission duration is the default retransmission duration specified for the second RAT, as shown at block B530. This is the case when the RF conditions are below the threshold. Such relationships may be illustrated by, but not limited to, equation (6).

Figure 6:
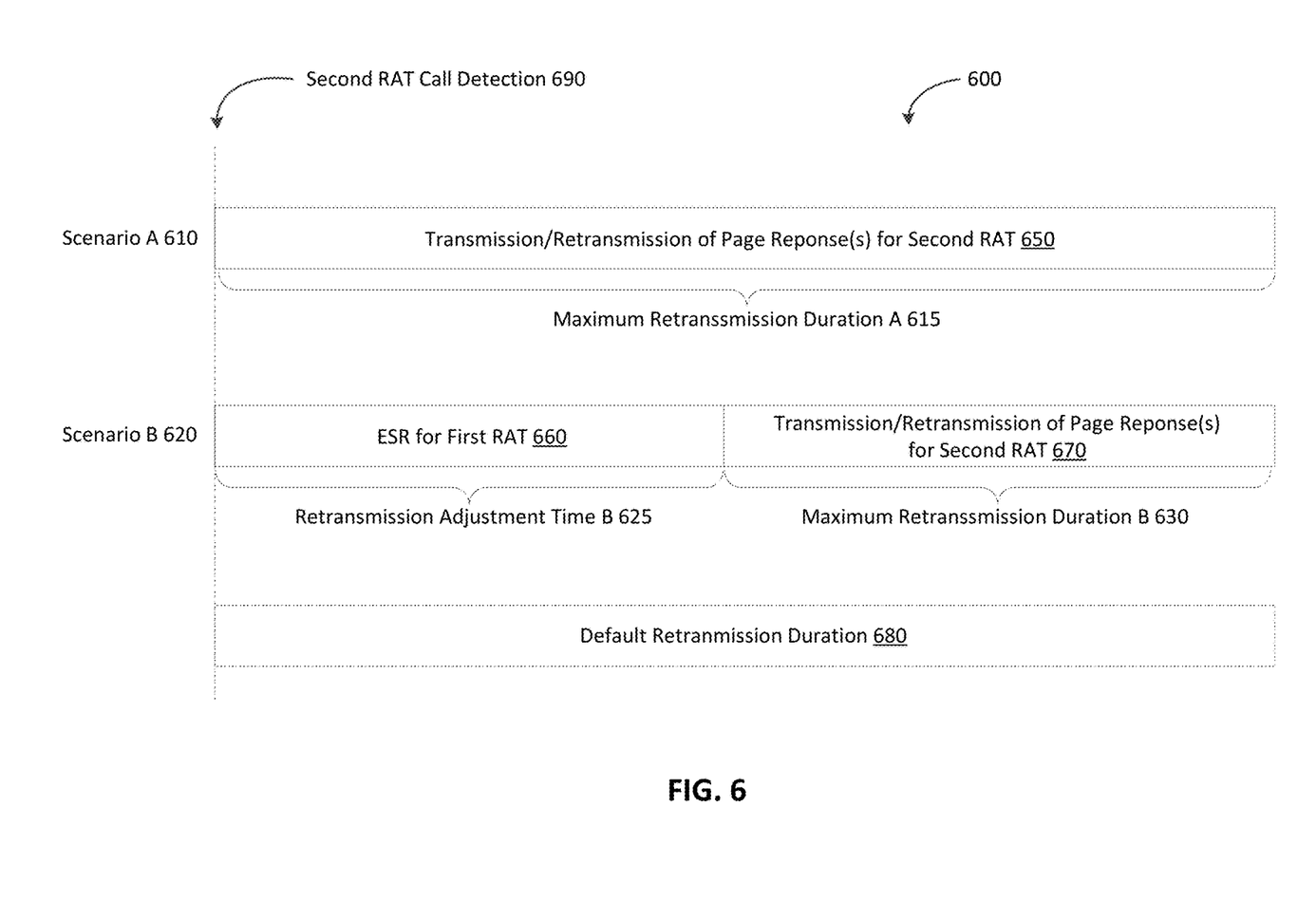
FIG. 6 is a schematic diagram illustrating an example of a call setup method according to various embodiments.

FIG. 6 is a schematic diagram 600 illustrating an example of at least one of the call setup methods 300, 400a, 400b, or 500 according to various embodiments. Scenario A 610 may refer to a situation in which the RF conditions are below the threshold. No ESR activities may be performed as a result. Transmission/retransmission of page response(s) for the second RAT 650 may be initiated in response to a second RAT call detection 690 (taking into account time for the network conditions determination at block B315). The maximum retransmission duration A 615 corresponding to Scenario A 610 may be used for conducting the transmission/retransmission of page response(s) for the second RAT 650. The maximum retransmission duration A 615 may be the same as the default retransmission duration 680.

Scenario B 620 may refer to a situation in which the RF conditions are not below the threshold. The ESR for first RAT 660 may be performed prior to transmission/retransmission of page response(s) for the second RAT 670 as a result. The transmission/retransmission of page response(s) for the second RAT 670 may be initiated at the completion of the ESR for first RAT 660, which would take retransmission adjustment time B 625. The maximum retransmission duration B 630 corresponding to Scenario B 620 may be used for conducting the transmission/retransmission of page response(s) for the second RAT 670. The maximum retransmission duration B 630 may be the default retransmission duration 680 subtracted by the retransmission adjustment time B 625.

Figure 7:
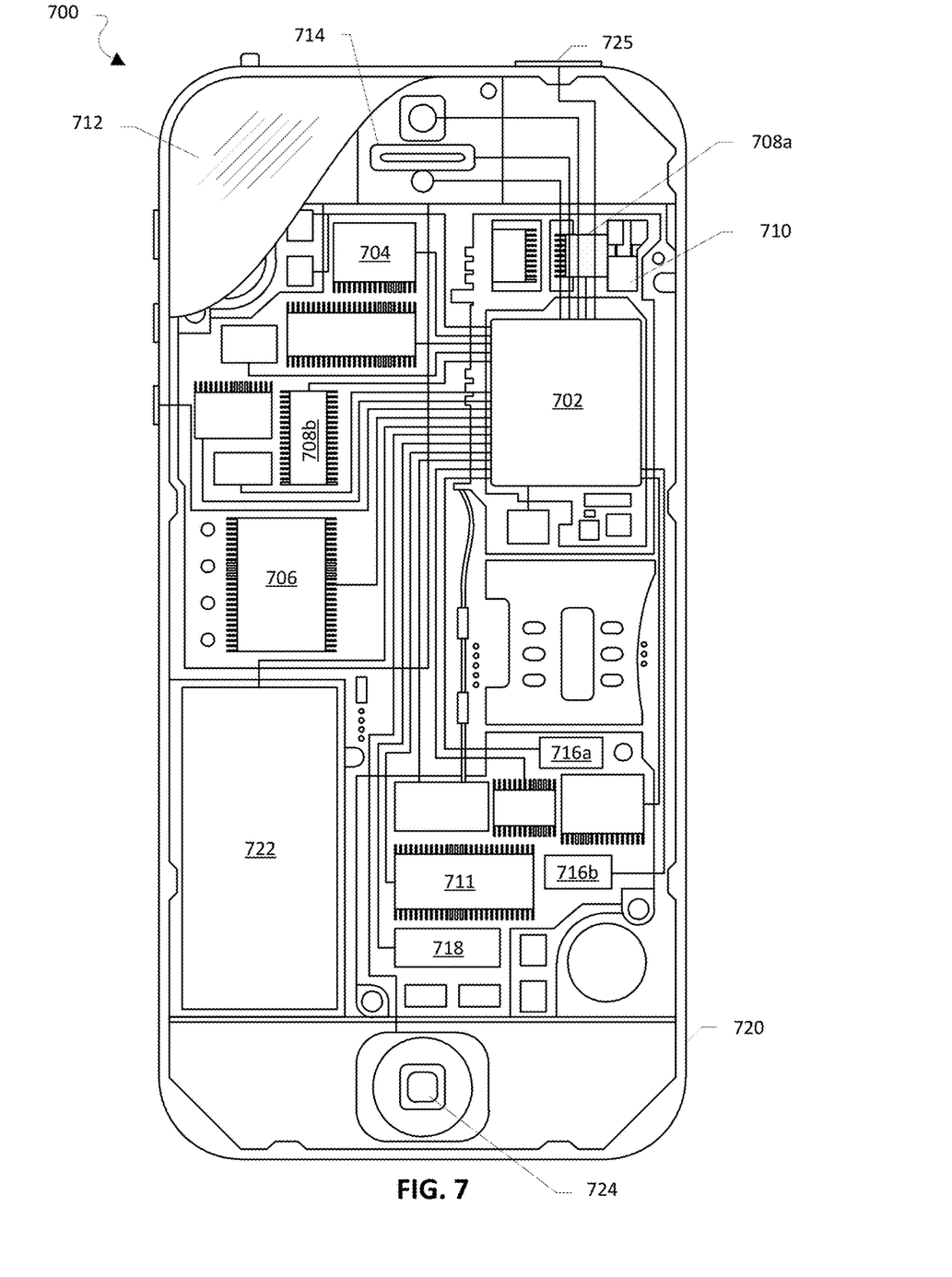
FIG. 7 is a component block diagram of a wireless communication device suitable for use with various embodiments.

The various embodiments may be implemented in any of a variety of wireless communication device 200, an example of which is illustrated in FIG. 7, as wireless communication device 700. As such, the wireless communication device 700 may implement the process and/or the apparatus of FIGS. 1-6, as described herein.

With reference to FIGS. 1-7, the wireless communication device 700 may include a processor 702 coupled to a touchscreen controller 704 and an internal memory 706. The processor 702 may be one or more multi-core integrated circuits designated for general or specific processing tasks. The memory 706 may be volatile or non-volatile memory, and may also be secure and/or encrypted memory, or unsecure and/or unencrypted memory, or any combination thereof. The touchscreen controller 704 and the processor 702 may also be coupled to a touchscreen panel 712, such as a resistive-sensing touchscreen, capacitive-sensing touchscreen, infrared sensing touchscreen, etc. Additionally, the display of the wireless communication device 700 need not have touch screen capability.

The wireless communication device 700 may have one or more cellular network transceivers 708a, 708b coupled to the processor 702 and to at least one antenna 710 and configured for sending and receiving cellular communications. The transceivers 708a, 708b and antenna 710 may be used with the above-mentioned circuitry to implement the various embodiment methods. The cellular network transceivers 708a, 708b may be the resource 218. The antenna 710 may be the antenna 220. The wireless communication device 700 may include two or more SIM cards 716a, 716b, corresponding to SIM-1 204a and SIM-2 204b, coupled to the transceivers 708a, 708b and/or the processor 702. The wireless communication device 700 may include a cellular network wireless modem chip 711 (e.g., the baseband modem processor 216) that enables communication via at least one cellular network and is coupled to the processor 702.

The wireless communication device 700 may include a peripheral device connection interface 718 coupled to the processor 702. The peripheral device connection interface 718 may be singularly configured to accept one type of connection, or multiply configured to accept various types of physical and communication connections, common or proprietary, such as USB, FireWire, Thunderbolt, or PCIe. The peripheral device connection interface 718 may also be coupled to a similarly configured peripheral device connection port (not shown).

The wireless communication device 700 may also include speakers 714 for providing audio outputs. The wireless communication device 700 may also include a housing 720, constructed of a plastic, metal, or a combination of materials, for containing all or some of the components discussed herein. The wireless communication device 700 may include a power source 722 coupled to the processor 702, such as a disposable or rechargeable battery. The rechargeable battery may also be coupled to a peripheral device connection port (not shown) to receive a charging current from a source external to the wireless communication device 700. The wireless communication device 700 may also include a physical button 724 for receiving user inputs. The wireless communication device 700 may also include a power button 726 for turning the wireless communication device 700 on and off.

According to the foregoing, the wireless communication device 200 (110, or 700) may benefit from a faster call setup for the second RAT by avoiding unrealistic ESR attempts for the first RAT when the RF conditions associated with the first RAT are bad. On a related note, starting to transmit the page responses without waiting for the APM parameters would further reduce the total call setup time.

The various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

The foregoing method descriptions and the process flow diagrams are provided merely as illustrative examples and are not intended to require or imply that the steps of various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In some exemplary embodiments, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to some embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for a wireless communication device having a first Subscriber Identity Module (SIM) and a second SIM, the method comprising:
   detecting a call for the second SIM;
   in response to detecting the call for the second SIM and determining that network conditions associated with the first SIM are above or equal to a threshold, performing a fallback procedure for the first SIM; and
   transmitting, within a maximum retransmission time, at least one page response after the fallback procedure has been completed, wherein the maximum retransmission time is related to a default retransmission time for the second SIM.

2. The method of claim 1, further comprising configuring the wireless communication device to operate in a Single Radio Long Term Evolution (SRLTE) mode.

3. The method of claim 1, further comprising configuring the wireless communication device to hold the first SIM and the second SIM, wherein:
   the first SIM corresponds to a first radio access technology (RAT);
   and the second SIM corresponds to a second RAT.

4. The method of claim 1, wherein the threshold is associated with packet delays for packets transmitted via the first SIM.

5. The method of claim 1, wherein the threshold is from the group consisting of a Reference Signal Receive Power (RSRP), a Reference Signal Received Quality (RSRQ), and a Signal to Interference and Noise Ratio (SINR).

6. The method of claim 1, wherein the fallback procedure includes an Extended Service Request (ESR).

7. The method of claim 1, wherein:
   the at least one page response is transmitted for a maximum retransmission time;
   the maximum retransmission time equals to a default retransmission time specified for the second SIM minus a retransmission adjustment time; and
   the retransmission adjustment time is time used to complete the fallback procedure.

8. The method of claim 1, further comprising:
   bypassing the fallback procedure for the first SIM in response to determining that the network conditions associated with the first SIM are below the threshold.

9. The method of claim 8, wherein:
   the at least one page response is transmitted for a maximum retransmission time; and
   the maximum retransmission time is a default retransmission time specified for the second SIM.

10. The method of claim 1, wherein a first page response of the at least one page response is transmitted without waiting for updates of an Access Parameter Message (APM).

11. The method of claim 10, further comprising:
    receiving an updated APM after transmitting the first page response; and
    using the updated APM for a subsequent page response for a second RAT.

12. The method of claim 1, further comprising transmitting the at least one page response until the call for the second SIM is connected or until the maximum retransmission time expires without connecting the call.

13. The method of claim 1, wherein:
    a first RAT is associated with the first SIM of the wireless communication device; and
    a second RAT is associated with the second SIM of the wireless communication device.

14. The method of claim 1, further comprising determining the network conditions associated with the first SIM in response to detecting the call for the second SIM.

15. A wireless communication device, comprising:
    at least one radio frequency (RF) resource;
    a processor coupled to the at least one RF resource; and
    a memory storing instructions that, when executed by the processor, cause the wireless communication device to:
       detect a call for a second Subscriber Identity Module (SIM);
       in response to detection of the call for the second SIM and a determination that network conditions associated with a first SIM are above or equal to a threshold, perform a fallback procedure for the first SIM; and
       transmit, within a maximum retransmission time, at least one page response after the fallback procedure has been completed, wherein the maximum retransmission time is related to default retransmission time for the second SIM.

16. The wireless communication device of claim 15, wherein the threshold is associated with packet delays for packets transmitted via the first SIM.

17. The wireless communication device of claim 15, wherein the threshold is from the group consisting of a Reference Signal Receive Power (RSRP), a Reference Signal Received Quality (RSRQ), and a Signal to Interference and Noise Ratio (SINR).

18. The wireless communication device of claim 15, wherein the fallback procedure includes an Extended Service Request (ESR).

19. The wireless communication device of claim 15, wherein:
   the at least one page response is transmitted for a maximum retransmission time;
   the maximum retransmission time equals to a default retransmission time specified for the second SIM minus a retransmission adjustment time; and
   the retransmission adjustment time is time used to complete the fallback procedure.

20. The wireless communication device of claim 15, wherein execution of the instructions causes the wireless communication device to further:
   bypass the fallback procedure for the first SIM in response to determining that the network conditions associated with the first SIM are below the threshold.

21. The wireless communication device of claim 20, wherein:
   the at least one page response is transmitted for a maximum retransmission time; and
   the maximum retransmission time is a default retransmission time specified for the second SIM.

22. The wireless communication device of claim 15, wherein a first page response of the at least one page response is transmitted without waiting for updates of an Access Parameter Message (APM).

23. The wireless communication device of claim 22, wherein execution of the instructions causes the wireless communication device to further:
   receive an updated APM after transmitting the first page response; and
   use the updated APM for a subsequent page response for a second RAT.

24. The wireless communication device of claim 15, the processor is further configured to transmit the at least one page response until the call for the second SIM is connected or until the maximum retransmission time expires without connecting the call.

25. A method for a wireless communication device having a first Subscriber Identity Module (SIM) and a second SIM the method comprising:
   detecting a call for the second SIM;
   in response to detecting the call for the second SIM and determining that network conditions associated with the first SIM are above or equal to a threshold:
   performing a fallback procedure for the first SIM;
   transmitting at least one page response responding to the detected call, wherein the at least one page response is transmitted without validating an Access Parameter Message (APM);
   receiving an updated APM; and
   using the updated APM for subsequent retransmission of the at least one page response; and
   in response to detecting the call for the second SIM and determining that the network conditions associated with the first SIM are below the threshold:
   bypassing the fallback procedure for the first SIM.

26. A wireless communication device, comprising:
   at least one radio frequency (RF) resource;
   a processor coupled to the at least one RF resource; and
   a memory storing instructions that, when executed by the processor, cause the wireless communication device to:
   detect a call for a second Subscriber Identity Module (SIM);
   in response the detection of the call for the second SIM, and a determination that network conditions associated with a first SIM are above or equal to a threshold:
   perform a fallback procedure for the first SIM;
   transmit at least one page response to respond to the detected call, wherein the at least one page response is transmitted without validating an Access Parameter Message (APM);
   receive an updated APM; and
   use the updated APM for subsequent retransmission of the at least one page response; and
   in response to detecting the call for the second SIM and a determination that the network conditions associated with the first SIM are below the threshold:
   bypass the fallback procedure for the first SIM.

* * * * *